Figure 1:
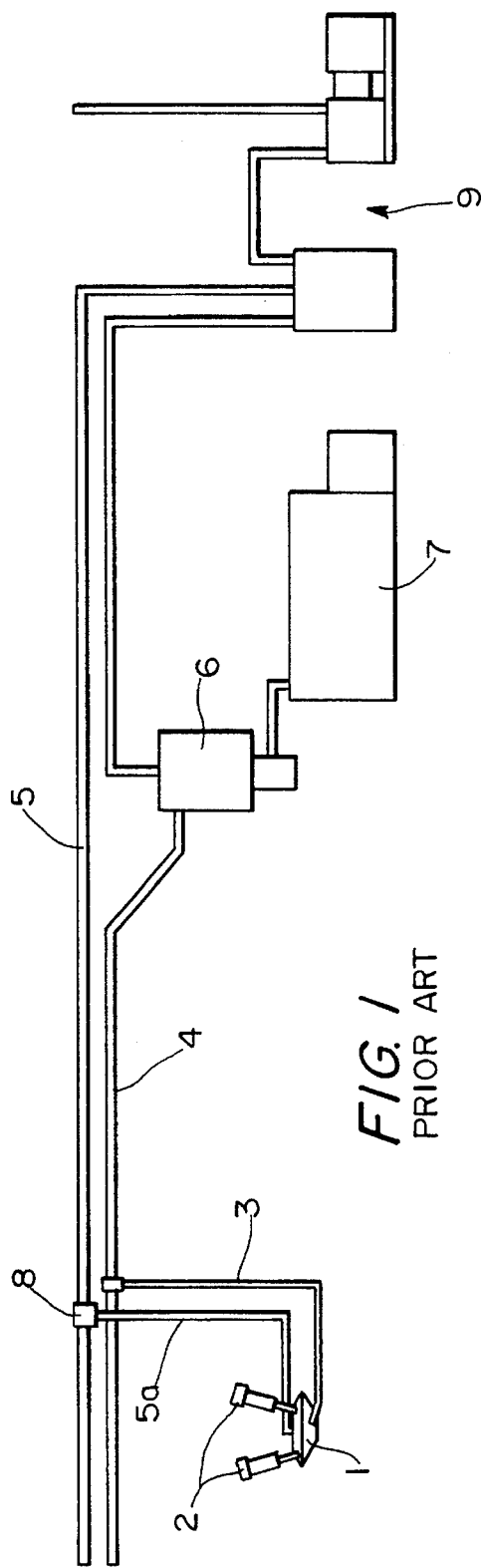

United States Patent [19]

Forsström

[11] Patent Number: 5,546,892
[45] Date of Patent: Aug. 20, 1996

[54] APPARATUS FOR SEPARATING MILK AND AIR FROM EACH OTHER AT AN EARLY STAGE IN A PIPE MILKING MACHINE

[75] Inventor: Christer Forsström, Vantaa, Finland

[73] Assignee: Pellonpaja Oy, Yliharma, Finland

[21] Appl. No.: 325,313

[22] PCT Filed: May 7, 1993

[86] PCT No.: PCT/FI93/00199

§ 371 Date: Oct. 24, 1994

§ 102(e) Date: Oct. 24, 1994

[87] PCT Pub. No.: WO93/22902

PCT Pub. Date: Nov. 25, 1993

[30] Foreign Application Priority Data

May 8, 1992 [FI] Finland .................. 922092

[51] Int. Cl.$^6$ ............................................. A01J 5/007
[52] U.S. Cl. ................................................. 119/14.08
[58] Field of Search .................... 119/14.02, 14.08, 119/14.37

[56] References Cited

U.S. PATENT DOCUMENTS 3,373,720  3/1968  Duncan ................. 119/14.37 X
4,190,020  2/1980  Tamás et al. ................. 119/14.08
4,607,596  8/1986  Whittlestone et al. ............. 119/14.02
4,793,285  12/1988  Marshall ....................... 119/14.02

FOREIGN PATENT DOCUMENTS 65697  7/1984  Finland .
75083  5/1988  Finland .

*Primary Examiner*—Robert P. Swiatek
*Attorney, Agent, or Firm*—Francis A. Keegan; Lalos & Keegan

[57] ABSTRACT

Apparatus for separating milk and air from each other at an early stage in a pipe milking machine, comprising a claw (1) and a pump assembly (10) in flow communication therewith and connected with a vacuum tube (5) and including a pump for pumping milk into a normal-pressure milk pipe (4a) coupled with assembly (10). In the apparatus, negative-pressure milk and air are supplied from claw (1) to pump assembly (10) for effecting the separation of air from milk, followed by pumping the milk into normal-pressure milk pipe (4a). The supply of milk from claw (1) to pump assembly (10) is essentially effected by gravity alone.

7 Claims, 9 Drawing Sheets

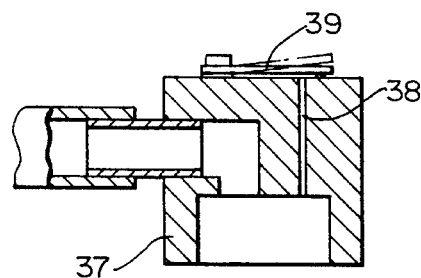
FIG. 10a
FIG. 10
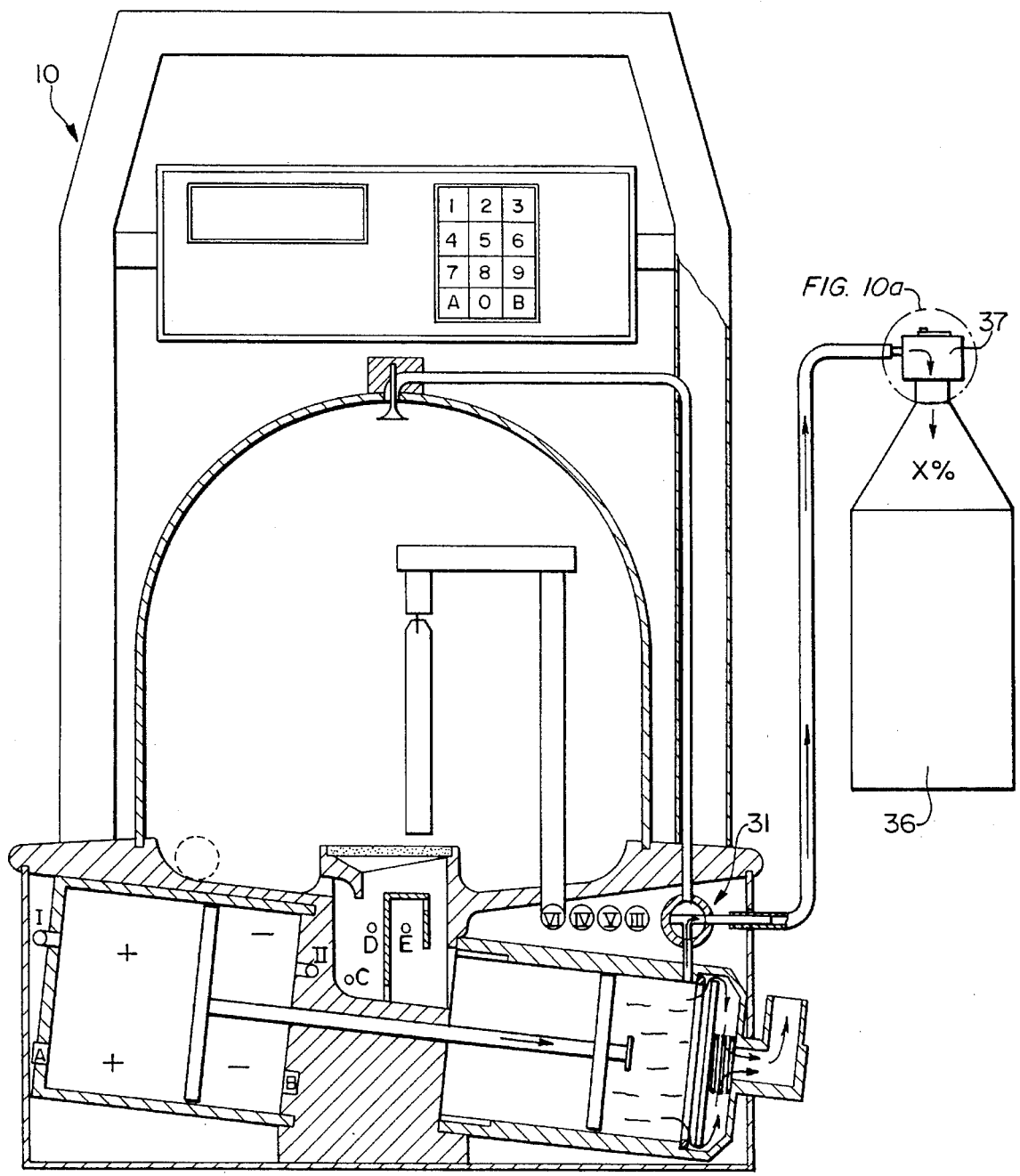

APPARATUS FOR SEPARATING MILK AND AIR FROM EACH OTHER AT AN EARLY STAGE IN A PIPE MILKING MACHINE

The present invention relates to an apparatus for separating milk and air from each other at an early stage in a pipe milking machine, comprising a centrepiece or claw and a pump assembly, which is in flow communication therewith, connected to a vacuum tube, and includes a body element and pump means for pumping milk into a normal-pressure milk pipe connected with the assembly.

EP Patent publication 0119222 discloses a method and apparatus for improved milking, wherein milk and air are separated at an early stage by passing the air from a claw in an overhead path into a vacuum tube and by conveying the milk by means of a pump in an underhand path along a vacuum tube into a milk pipe. EP Patent publication 0171403 discloses an apparatus for measuring previously milked milk especially in systems as disclosed in EP Patent publication 0119222.

An object of the present invention is to provide an improved apparatus for separating air and milk from each other. In order to achieve this object, an apparatus of the invention is characterized by what is set forth in the characterizing section of claim 1.

One benefit offered by an apparatus of the invention is that at no time is it necessary for milk to be drawn up by the direct application of vacuum (by means of air), the vacuum being only used in the claw for a milking operation (pulsation). Thus, the vacuum prevailing inside a teat cup remains substantially constant throughout a milking operation. By virtue of this permanently constant vacuum the flow diagram of milk can be made more level and, thus, the milking time can be reduced.

It is true that the pump means included in a pump assembly make use of vacuum, but operation of the pump means simultaneously effects the separation of milk and air, whereby the milk only is pumped into a normal-pressure milk pipe while air discharges from the pump assembly into the vacuum tube.

Figure 2:
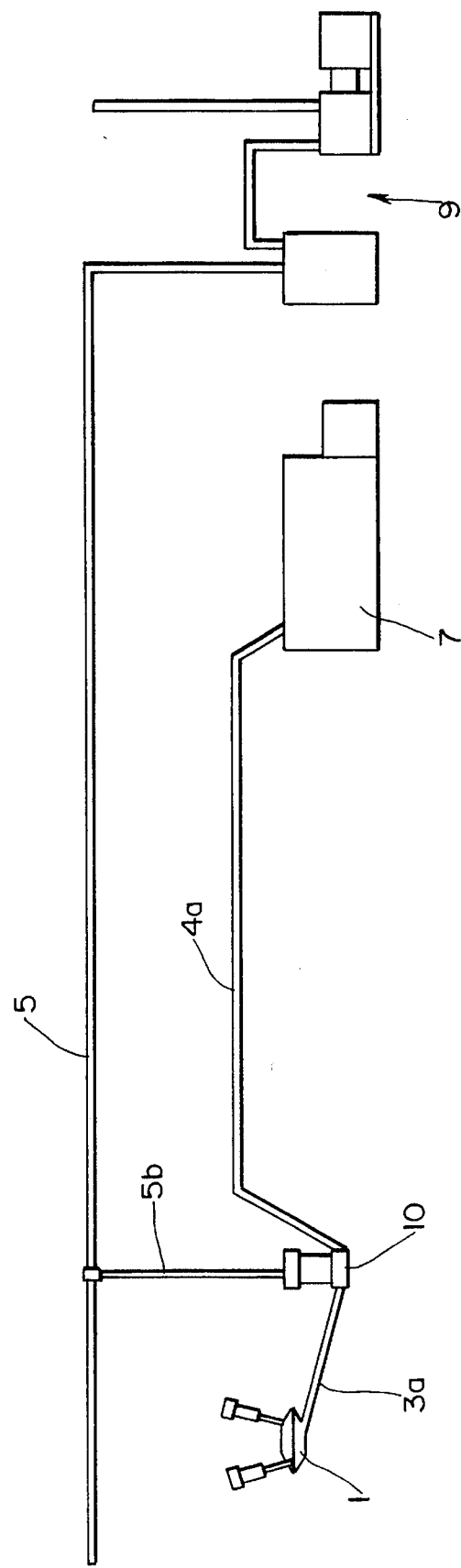
Figure 3:
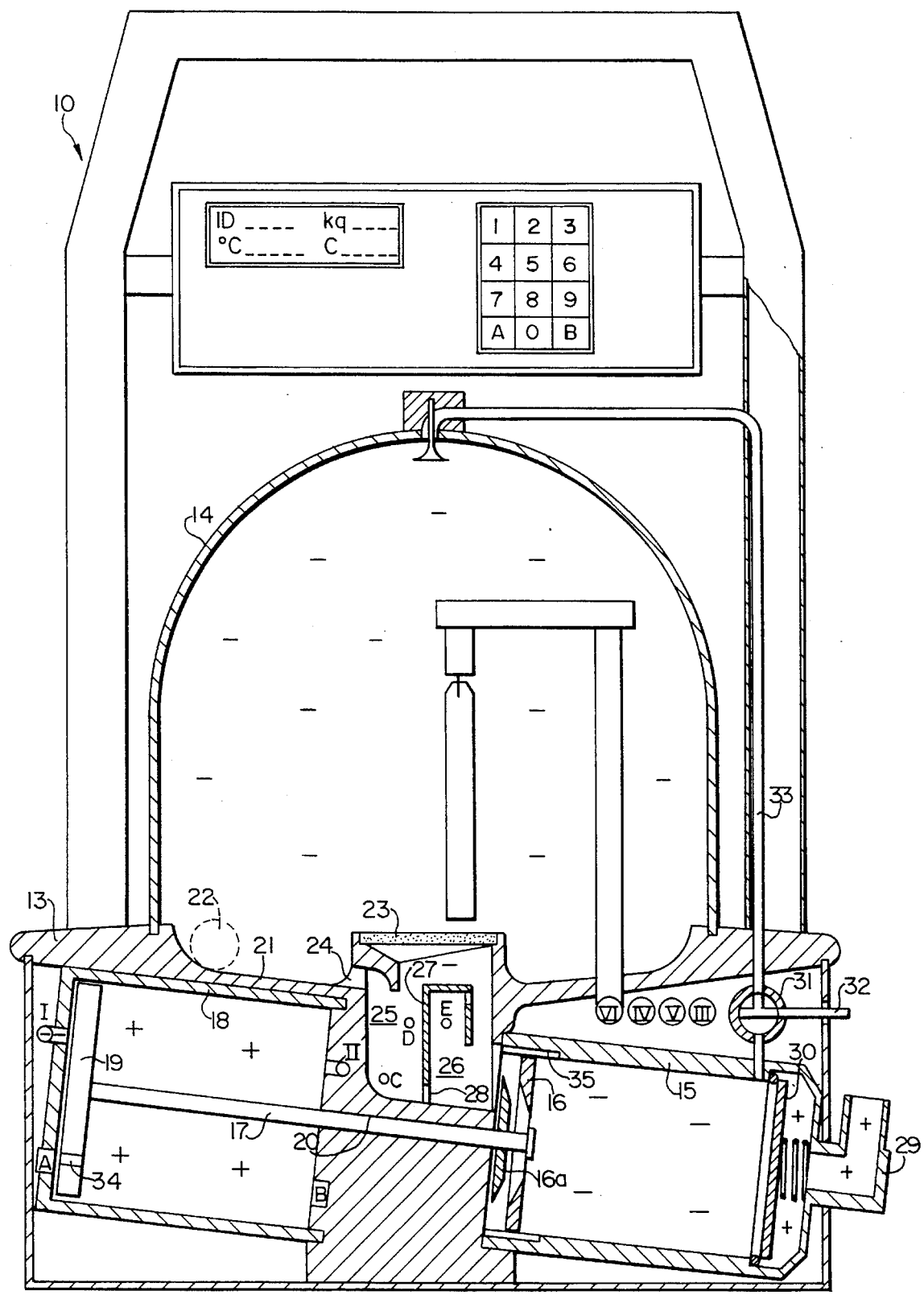

The invention will now be described with reference made to the accompanying drawings, which illustrate one exemplary embodiment for an apparatus of the invention. In the drawing figures:

FIG. 1 is a schematic view showing the principle for a pipe milking machine configuration according to prior art, FIG. 2 is a schematic view showing the principle for a pipe milking machine configuration employing an apparatus of the invention, FIGS. 3–10 are schematic sectional views showing various operating stages for one embodiment of a pumping assembly for use in an apparatus of the invention.

A prior art apparatus shown in FIG. 1 includes a claw 1 provided with teat cups 2. The operation of teat pads or rubbers included in the teat cups as well as the aspiration of milk in a state of negative pressure into a negative-pressure milk pipe 4 are controlled by means of a pulsator 8, said pulsator being connected to a vacuum tube 5 and linked with the claw by means of a tube 5a. The milk is carried in a negative-pressure state along milk pipe 4 into a collector tank 6 for effecting the separation of milk and air, the milk being delivered into a farm tank 7 and the air to a vacuum assembly 9. One of the drawbacks in this type of pipe milking machine is that vacuum fluctuates in the teat rubber during a milking operation, which is partially responsible for the teat ends getting wet in milk which could be a factor contributing to udder infection. In addition, the milk is carried along with air through a relatively long distance all the way to a collector tank, whereby the milk has time to cool and the crystallization of milk fat begins. The removal of milk from a collector tank by means of a pump applies a major stress on the fat globule in its sensitive crystallization process. Completely crystallized or uncrystallized is the best form for milk to tolerate conditioning, such as pumping, which is why the separation of milk and air as well as the pumping of milk into a farm tank should be effected at a stage as early as possible.

On the other hand, FIG. 2 illustrates a pipe milking assembly with an apparatus of the invention employed therein. The corresponding components in FIGS. 1 and 2 are indicated by the same reference numerals. The assembly of FIG. 2 differs essentially from that of FIG. 1 in that a claw 1 is coupled by way of a tubing 3a with a pump assembly 10 for effecting the separation of milk and air, the pump means included in said pump assembly being used for pumping milk into a normal-pressure milk pipe 4a and further along into a farm tank 7. The negative-pressure air is in turn delivered from pump assembly 10 into a vacuum tube 5. The vacuum or negative pressure is supplied into the centrepiece by way of pump assembly 10 along the top section of milk tubing 3a, said pump assembly 10 being positioned in operation such that milk flows essentially by the action of gravity alone from the claw to the pump assembly while the vacuum only has an effect primarily on the operation of teat rubbers, i.e. the vacuum does not participate, at least not essentially, in the transfer of milk. By virtue of this arrangement, a vacuum inside the teat rubbers remains substantially constant throughout a milking process.

FIGS. 3–10 are schematic sectional views, showing one preferred embodiment for a pump assembly at its various operating stages. In this embodiment, a pump assembly 10 includes a body element 13, on which is mounted a hood element 14. The body element 13 is provided with pump means, including a milk pump consisting of a milk cylinder 15 and a pump piston 16, 16a axially movable therein, as well as a vacuum pump consisting of an operating cylinder 18 and an operating piston 19 axially movable therein. Milk cylinder 15 and operating cylinder 18 are mounted axially one after the other, in a substantially horizontal position in said body element 13 located in the bottom section of pump assembly 10. In this context, it should be noted that a substantially horizontal position is considered to include also angles of inclination of up to about 10° between the longitudinal centre axes of said cylinders and the floor level of said apparatus, e.g. in FIGS. 3–10 this angle is about 7°. Pump piston 16, 16a and operating piston 19 are connected to each other by a common piston rod 17, forming an axis for the pump piston 16, 16a and milk cylinder 15. The piston rod 17 is adapted to operate in a hole 20 connecting said cylinders 15 and 18. The vacuum pump operating cylinder 18 and operating piston 19 are preferably elliptical in cross-section, the major axis of the ellipse being made substantially horizontal with the vacuum pump fitted in said pump assembly 10.

The body element 13, its top surface is provided with a discoidal flow-in space 21 for milk, wherein the milk flows through a milk inlet port 22. Above the median plane of the milk cylinder, the central area of space 21 is provided with a milk inlet chamber, which is in flow communication with the milk cylinder and includes a receiving chamber 25 and a filling chamber 26. Receiving chamber 25 and filling chamber 26 are separated from each other by a partition 27, whose top portion is provided on the side of filling chamber 26 with a lip member 27a. Within the lip member is mounted a pair of flow electrodes E, said electrodes serving as first control elements for operating piston 19. The receiving chamber is further provided with pairs of electrodes C and D, with electrodes C detecting the termination of milk flow and electrodes D measuring various factors contributing to the quality of milk, e.g. electrical conductivity, which is an indicator for the cell number of milk or actually for a change in the cell number of milk. It is also possible to measure milk e.g. for the temperature thereof. During abundant milk supply, the milk arriving in said milk flow-in space 21 circulates circumferentially around the space and progresses towards the central area, whereby the primary flow into the inlet chamber proceeds through a screen element 23, mounted on top of the inlet chamber and above the bottom section of flow-in space 21, into receiving chamber 25 while some of the milk flows into receiving chamber 25 through a port 24 connecting the bottom section of flow-in space 21 and the inlet chamber. During the time of lesser milk supply, the milk flows into receiving chamber 25 mainly through port 24. From the receiving chamber, the milk flows primarily over partition 27 into the filling chamber and further to milk cylinder 15. With decreasing milk supply, the milk flows mainly through an opening 28 in the lower part of partition 27 into filling chamber 26 and further to milk cylinder 15.

The end of milk cylinder 15 facing away from the inlet chamber is connected by way of a return valve 30 to a milk pipe coupling stub 29. This end is also fitted with a three-way valve 31 for selecting a desired function for the pump assembly (pumping, sampling or washing of milk).

In the illustrated embodiment, the pump assembly further includes as essential components 6 magnetic valves (I–VI), two I, II of which serve to control the action of the operating cylinder, two IV, V serve as a pulsator for the claw, one VI supplies vacuum into the pump assembly (into hood element 14), and one serves to the control the operation of a remover (not shown). In addition, the operating piston is provided with a magnet 34, which is in cooperation with a sensor A and B at either axial end of the operating cylinder for detecting the position of the operating cylinder in the vicinity of either end.

Figure 4:
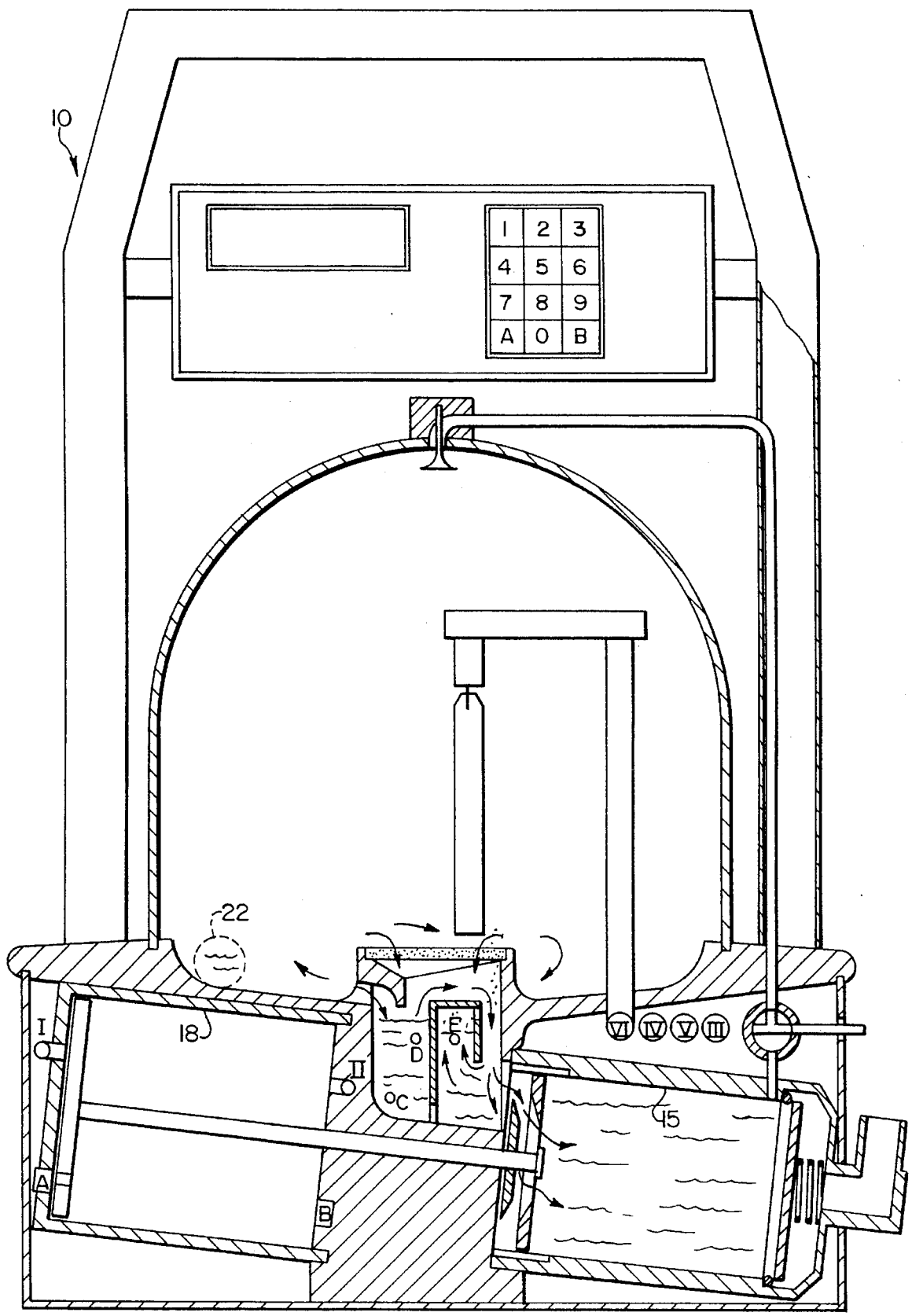
Figure 5:
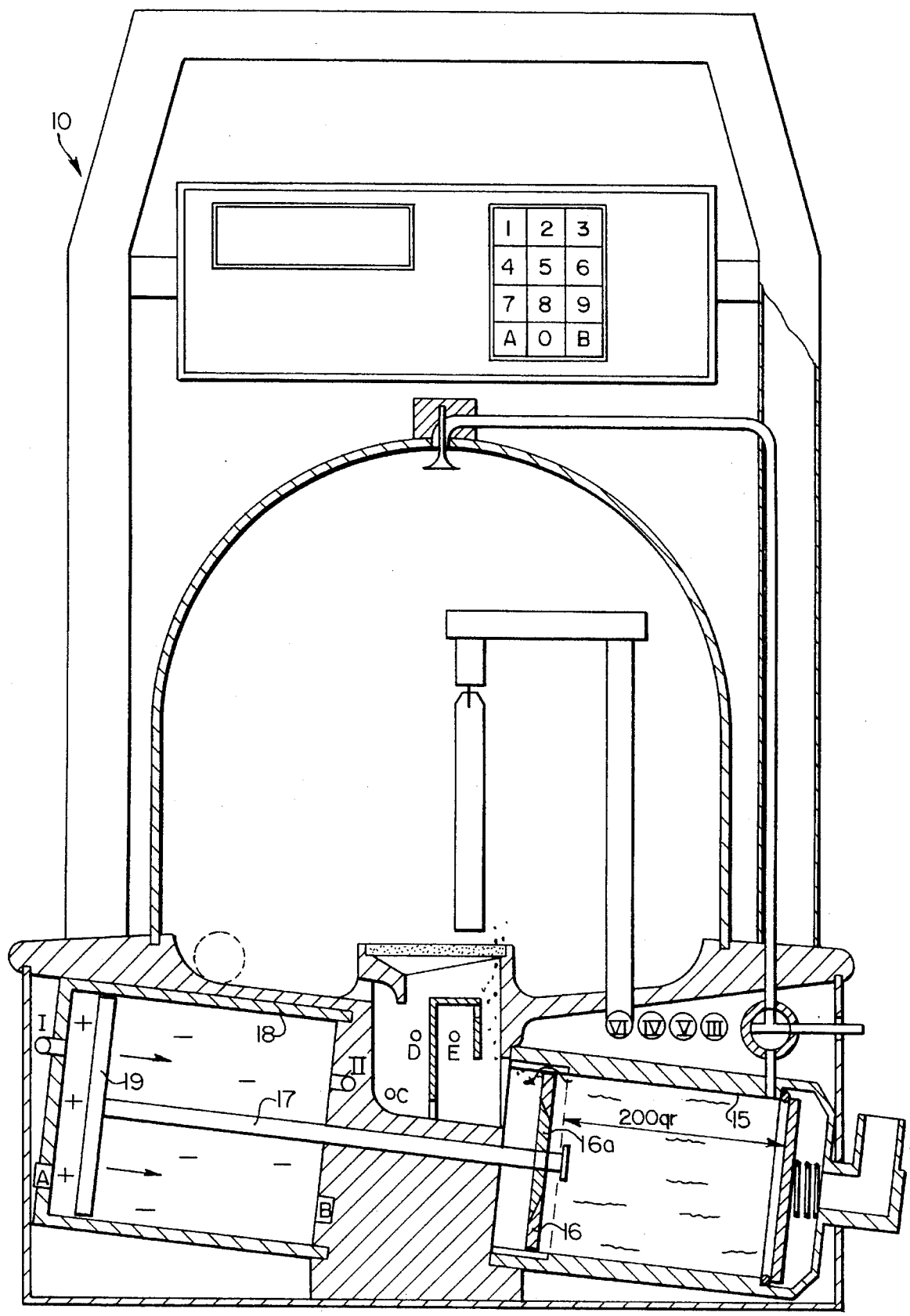
Figure 6:
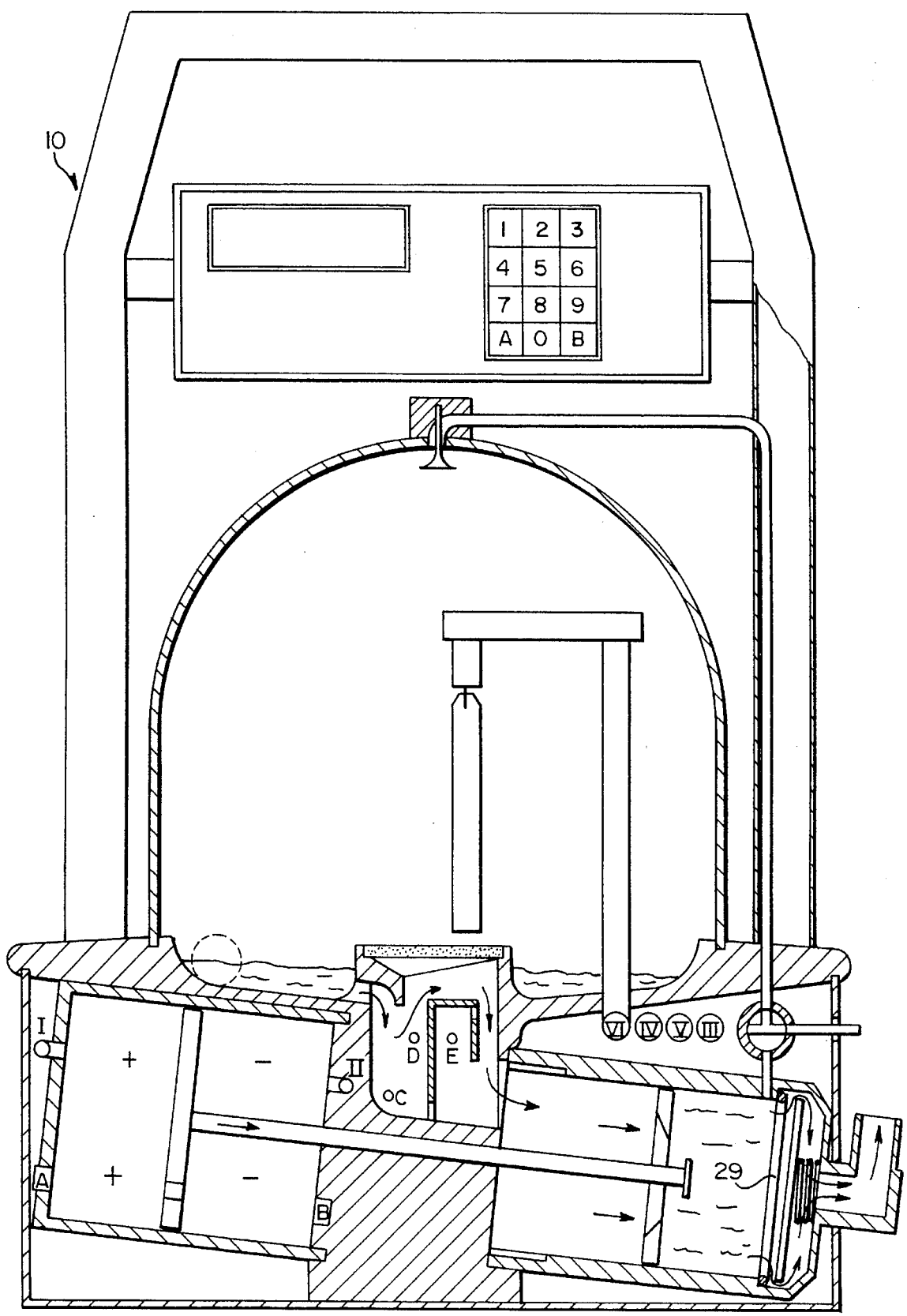

The following explains the operation of an apparatus of the invention described by way of an example. At first, a pump assembly 10 is conveyed by carrying or along tracks into a cowshed between the cows. Negative-pressure tubes 5b (the number of hoses is preferably two) are coupled with vacuum tube 5 and a milk supply pipe 4a with coupling stub 29 of pump assembly 10. The pump assembly 10 is actuated by using the number of a cow to be milked. Pulsators IV, V are actuated and pump pistons 16, 16a; 19 move to a starting position. Gauges or meters have been zeroed and vacuum is switched on in hood 14 included in pump assembly 10. A string included in the removers is pulled out and a milker is fastened to the udders of a cow. Milk flows into pump assembly 10 in milk flow-in space 21, progressing into the inlet chamber and filling said receiving chamber 25 included in the inlet chamber, crossing over a flow plate 27 and proceeding through said filling chamber 26 to milk cylinder 15. The milk cylinder 15 fills up and milk rises to the level of flow plate 27. Electrodes E included in flow plate 27 below said lip 27a are contacted after the level of milk has displaced the air found below the lip (FIG. 4). The vacuum pump receives a start command, whereby valve II switches on vacuum in a space of vacuum pump cylinder 18 facing towards the milk cylinder and, respectively, valve I bleeds air into the opposite aide of piston 19. A shaft 17 connecting vacuum pump piston 19 and milk pump piston 16, 16a shifts to the right in FIG. 5, the centre 16a of milk pump piston 16 fixed to the connecting shaft sealing a flow port included in said milk pump piston 16 and carrying said entire milk pump piston 16, 16a to the right. An edge sealing (not shown) included in the milk pump piston seals said piston 16 against the wall of cylinder 15. The cylinder wall 15, its inlet end (the end facing said inlet chamber) is provided with a slotting 35 for allowing the air still trapped in milk to escape from cylinder 15 for maintaining a required measuring precision. The actual pumping begins at the point where said slotting 35 of cylinder 15 comes to an end. A return valve 29 mounted on the end of milk cylinder 15 is opened by the action of fluid pressure and milk progresses into milk pipe 4a (FIG. 6).

Figure 7:
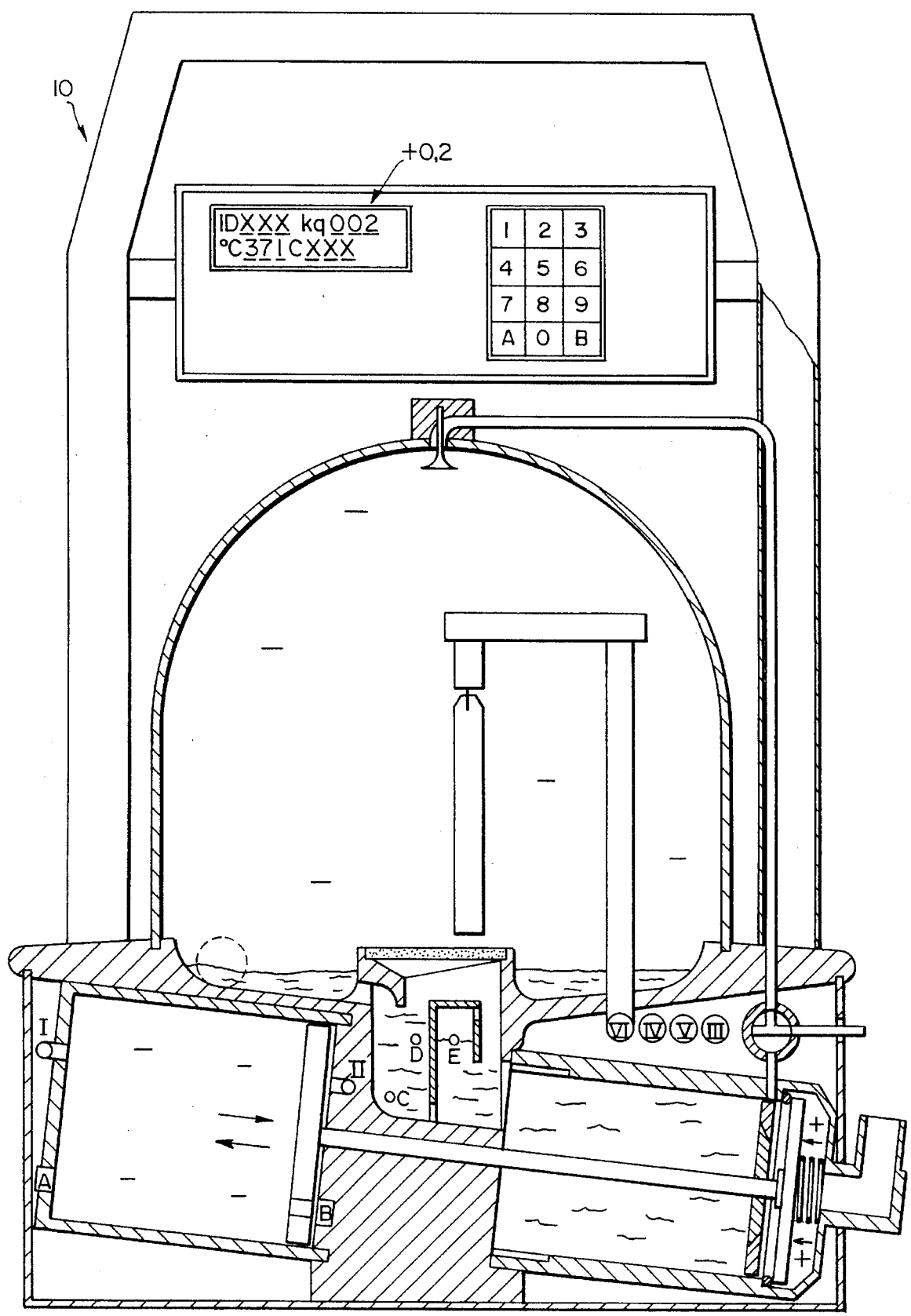
Figure 8:
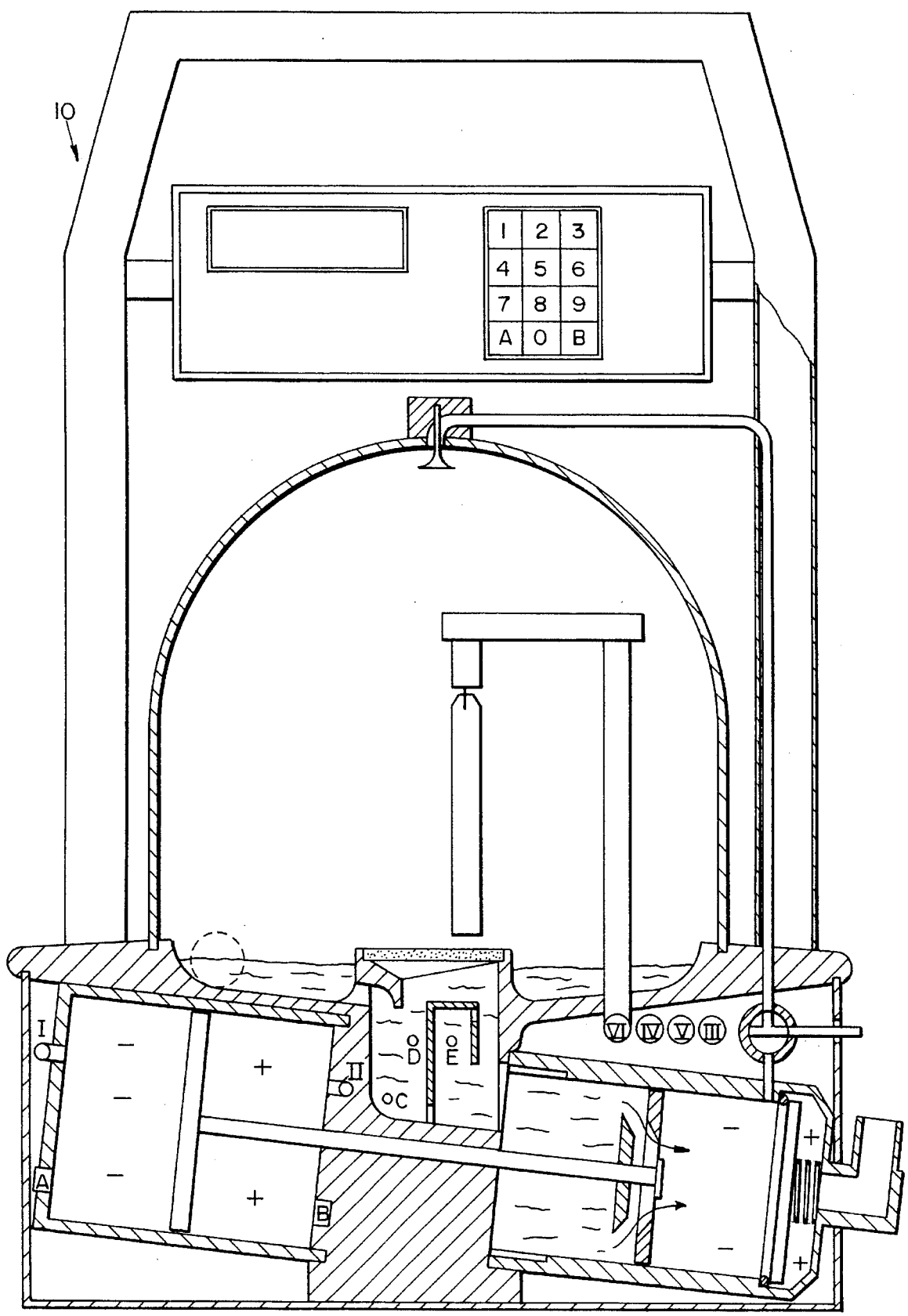
Figure 9:
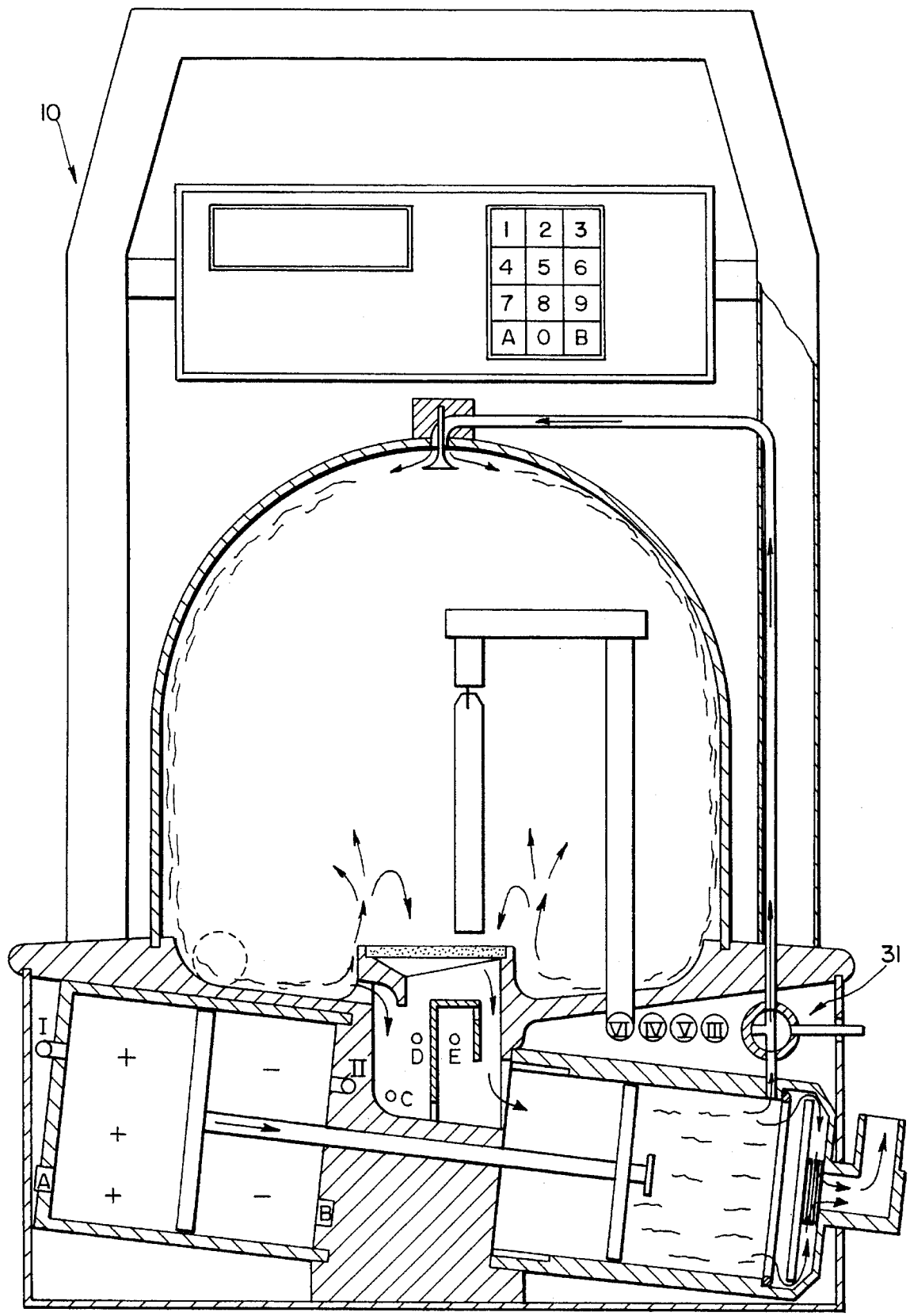

The pumping action continues until a magnet 34 mounted on vacuum pump piston 19 activates a sensor B located at the bottom dead point. Thus, the direction of vacuum pump control valves I, II reverses, whereby valve I releases vacuum into vacuum pump cylinder 18 on the side of piston 19 facing away from the milk pump and valve II releases air into the cylinder space facing towards the milk pump. For the beginning of the reverse action said return valve 29 closes for blocking the flow of air or milk into milk cylinder 15 (FIG. 7). The centre 16a of piston 16 disengages from the milk pump piston, whereby the volume behind piston 16 increases during the reverse or return action. Milk flows into the milk pump and behind piston 16 (FIG. 8). Pistons 16, 16a; 19 shift to the left until a sensor A located at the top dead point activates, whereby the next pumping operation is possible as flow electrodes E are back in contact. The pumping operations are repeated until milking of the cow is completed. Each pumping operation corresponds to 200 g and the output of a cow is recorded by counting the number of pumping operations, e.g. 52×0,200 kg=10,4 kg of milk.

The pump assembly records also the time, whereby the processor can be used for calculating e.g. the average flow rate, peak flow rate, milking time etc. In addition, the measuring electrodes included in the pump assembly measure on each pumping cycle the electrical conductivity of milk, serving as a certain meter for the cell number of milk. Thus, changes in the condition (cell number) of the canals of a cow can be detected on time. Also temperature is measured continuously during the course of a milking cycle for detecting possible distress or illness (fever).

As the flow of milk trickles down towards the end of a milking cycle (flow rate less than 300 g/min), said opening 28 in flow plate 27 is sufficient for emptying the inlet chamber. As the flow of milk goes below this level (300 g), the chamber begins to deplete. The pair of electrodes are soon above the milk level and, thus, after an adjustable delay, the vacuum is switched off in the pump assembly (valve VI) and, thus, the air discharging from the milker equalizes the vacuum in the milker and the pump assembly detaching the milker from the udders of a cow. At the same time the pulsation stops and valve III opens and delivers vacuum into the cylinder of removers for lifting the milker to a position below the cylinder after its detachment from the udders. The detachment serves as an acknowledgement for the end of a milking cycle and the results are recorded in memory.

Pump assembly 10 is provided with a three-way valve 31 for selecting a desired function: milking, washing or sampling. In a washing operation (FIG. 9), some of the through-flowing water is returned by the pressure of a milk pump into pump assembly 10 for securing sufficient hygiene.

When said three-way valve 31 is in a sampling position (FIG. 10), a certain amount (appr. 1%) of milk flows into a sampling bottle 36. Bottle 36 is fitted with a cap 37 which includes an outlet 38 for air. The cap is also provided with a return flap or valve 39 for preventing air from entering pump assembly 10 during the return action of the pump.

An apparatus of the invention is suitable for use both with traditional claws including air intakes and with claws including no such air intake due to the fact that air is not needed for the transportation of milk.

The above description is only intended to show an example of one preferred embodiment for an apparatus of the invention and by no means to limit the scope of protection defined by the annexed claims.

I claim:

1. An apparatus for separating milk and air from each other at an early stage in a pipe milking machine, said apparatus comprising a milker claw (1) and a pump assembly (10) in flow communication therewith and connected to a vacuum tube (5) and including a body element (13) provided with an inlet chamber (25, 26) for milk flowing into the pump assembly (10), and pump means for pumping milk into a normal-pressure milk pipe (4a) connected with assembly (10), said pump means comprising a milk pump consisting of a milk cylinder (15) and a pump piston (16, 16a) axially movable therein, as well as a vacuum pump consisting of an operating cylinder (18) and an operating piston (19) axially movable therein mutually adjacent and with the pump piston (16, 16a) and operating piston (19) coupled functionally with each other, characterized in that the inlet chamber (25, 26) is mounted substantially above the axis of the milk cylinder (15) in flow communication with the milk cylinder (15) whereby, in operation, milk and air flow in the state of vacuum from the claw (1) to the pump assembly (10), the milk only flowing essentially by the action of gravity, and that the pump assembly (10) uses the pump piston (16, 16a) for bringing the milk flowing gravitationally through the inlet chamber (25, 26) to the milk cylinder (15) upwards to said normal-pressure milk pipe (4a).

2. An apparatus as set forth in claim 1, in that said milk cylinder (15) and said operating cylinder (18) are mounted in a substantially horizontal position in the bottom section of said pump assembly (10).

3. An apparatus as set forth in claim 2, in that the vacuum pump operating cylinder (18) and said operating piston (19) are elliptical in cross-section, the major axis of the ellipse being extended in a substantially horizontal direction when the vacuum pump is fitted in said pump assembly (10).

4. An apparatus as set forth in any of claims 1–3, in that the inlet chamber includes first sensor elements (E) for supplying control signals to control elements (I, II) for said operating piston (19), the operation of said first sensor elements (E) being based on the amount of milk contained in the inlet chamber, and that said operating cylinder (18) includes second sensor elements (A, B) for supplying control signals to said control elements (I, II) for said operating piston (19), the operation of said second sensor elements (A, B) being based on the position of said operating piston (19) in said operating cylinder (18), the action of said operating piston (19) being controlled by means of the cooperation between control signals supplied by said first (E) and said second (A, B) sensor elements.

5. An apparatus as set forth in claim 4, in that the inlet chamber is provided with a partition (27) for dividing the inlet chamber into a receiving chamber (25) for the milk arriving in said pump assembly (10) and a filling chamber (26) facing towards the milk pump, the milk or at least an essential part thereof flowing first into said receiving chamber (25) and further over the top edge of a partition (27) into said filling chamber (26) and further to said milk cylinder (15), whereby the top section of said partition (27) on the side facing said filling chamber (26) is provided with a lip portion (27a), inside which are fitted flow electrodes (E), serving as said first sensor elements and supplying said control signal once the milk pump and said filling chamber (26) are filled to such a degree that said flow electrodes (E) are contacted with each other through the intermediary of milk contained in said filling chamber (26).

6. An apparatus as set forth in claim 4, in that said second sensor elements comprise a magnet (34) included in said operating piston (19) as well as a sensor (A, B) mounted on at least one end of said operating cylinder (18) and supplying said control signal upon detecting the presence of magnet (34).

7. An apparatus as set forth in any of claims 1–3, in that the vacuum pump has control elements that include two magnetic valves (I, II), one (II) being adapted to apply a vacuum on the first side of said operating piston (19) facing towards the milk pump and other (I) to apply a normal atmospheric pressure on the other side of said operating piston (19) facing away from the milk pump upon receiving a necessary control signal once the milk pump is filled, said operating piston (19) effecting a working action and, in a corresponding fashion, said one valve (II) is adapted to apply normal atmospheric pressure on said first side and said other valve (I) is adapted to apply vacuum on said other side upon receiving a signal indicative of the completion of the working action of said operating piston (19), whereby said operating piston (19) effects a return action.

* * * * *